US012613359B2

(12) United States Patent (10) Patent No.: US 12,613,359 B2
Kuo et al. (45) Date of Patent: Apr. 28, 2026

(54) ELECTRONIC DEVICE

(71) Applicant: InnoLux Corporation, Miao-Li County (TW)

(72) Inventors: Yu-Tong Kuo, Miao-Li County (TW); Hong-Sheng Hsieh, Miao-Li County (TW); Huei-Ying Chen, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 350 days.

(21) Appl. No.: 18/309,732

(22) Filed: Apr. 28, 2023

(65) Prior Publication Data

US 2023/0384484 A1      Nov. 30, 2023

(30) Foreign Application Priority Data

May 31, 2022    (CN) ......................... 202210614178.X

(51) Int. Cl.
G02B 1/11 (2015.01)
(52) U.S. Cl.
CPC ..................................... G02B 1/11 (2013.01)
(58) Field of Classification Search
CPC ......... G02F 1/133512; G02F 1/133524; G02F 1/133516; G02F 1/133519; G92B 1/11; G02B 5/201

USPC ............................ 349/106–11; 359/601, 891
See application file for complete search history.

(56) References Cited

U.S. PATENT DOCUMENTS 6,157,426 A * 12/2000 Gu .................... G02F 1/133512
                                                              349/110
2016/0266436 A1* 9/2016 Jiao ......................... H10K 59/38

FOREIGN PATENT DOCUMENTS

CN          101299106 A     11/2008

* cited by examiner

*Primary Examiner* — Jessica M Merlin
(74) *Attorney, Agent, or Firm* — MUNCY, GEISSLER, OLDS & LOWE, P.C.

(57) ABSTRACT

An electronic device includes: a substrate; a color filter layer disposed on the substrate, wherein the color filter layer includes a light shielding unit and a plurality of color filter units adjacent to the light shielding unit, and the plurality of color filter units includes a first color filter unit, a second color filter unit and a third color filter unit; and a first refractive index-matching layer disposed between the substrate and the color filter layer, wherein the first refractive index-matching layer comprises an opening, and the opening and at least one of the light shielding unit, the first color filter unit, the second color filter unit and the third color filter unit are overlapped in a top view of the substrate.

12 Claims, 3 Drawing Sheets

ELECTRONIC DEVICE

CROSS-REFERENCE TO RELATED APPLICATIONS

This application claims the benefits of the Chinese Patent Application Serial Number 202210614178.X, filed on May 31, 2022, the subject matter of which is incorporated herein by reference.

BACKGROUND

Field

The present disclosure provides an electronic device. More specifically, the present disclosure provides an electronic device comprising a refractive index-matching layer.

Description of Related Art

With the continuous advancement of technology and in response to the usage habits of users, various types of display devices are still being developed and applied to various fields. At present, when the display device is used outdoors or under the condition of strong ambient light, there are still problems such as vision interference or contrast decrease caused by too strong reflected light.

In the current method, the reflectivity of different regions of the display device cannot be locally improved, resulting in poor anti-reflection effect, which further affects the contrast of the display device.

Therefore, it is still necessary to improve the display device so as to improve the conventional defects.

SUMMARY

The present disclosure provides an electronic device, which comprises: a substrate; a color filter layer disposed on the substrate, wherein the color filter layer comprises a light shielding unit and a plurality of color filter units adjacent to the light shielding unit, and the plurality of color filter units comprises a first color filter unit, a second color filter unit and a third color filter unit; and a first refractive index-matching layer disposed between the substrate and the color filter layer, wherein the first refractive index-matching layer comprises an opening, and the opening and at least one of the light shielding unit, the first color filter unit, the second color filter unit and the third color filter unit are overlapped in a top view of the substrate.

Other novel features of the disclosure will become more apparent from the following detailed description when taken in conjunction with the accompanying drawings.

DETAILED DESCRIPTION

Figure 1:
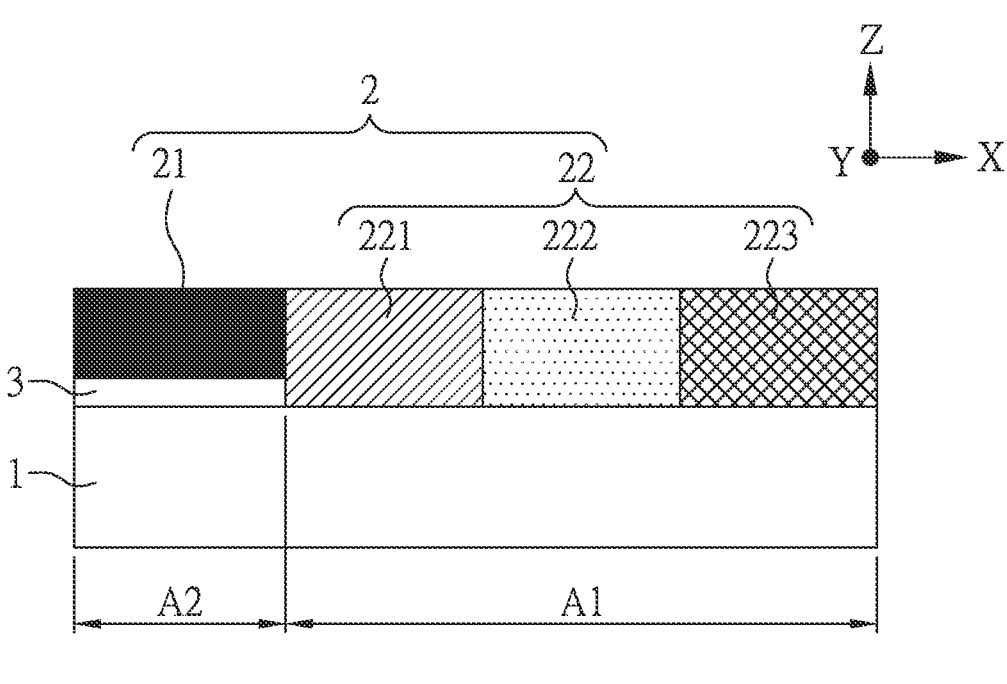
FIG. 1 is a cross-sectional view of a part of an electronic device according to one embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, terms such as "containing" and "comprising" are open-ended terms, and should be interpreted as meaning "including but not limited to . . . ".

Directional terms mentioned in the specification, such as "up", "down", "front", "rear", "left", "right", etc., only refer to the directions of the drawings. For example, "below" or "bottom" and "above" or "top" are used to describe the relative relationship of one element to another element of the drawings. It will be understood that if the device in the drawing was turned upside down, elements described on the "lower" side would then become elements described on the "upper" side. Accordingly, the directional term used is for the purpose of illustration, not limitation, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "equal to", "equal" or "same", "substantially", or "approximately", are generally interpreted as within 20% of a given value or range, or as within 10%, 5%, 3%, 2%, 1%, or 0.5% of a given value or range.

In the specification and claims, unless otherwise specified, ordinal numbers, such as "first", "second", etc., used herein are intended to modify elements, which do not imply and represent that the (or these) elements have any previous ordinal numbers, nor does not imply an order of one element over another, or an order in manufacturing methods. These ordinal numbers are used only to clearly distinguish an element with a certain designation from another element with the same designation. The claims and the description may not use the same term, accordingly, the first component in the description may be the second component in the claim.

In the present disclosure, the thickness may be measured by an optical microscope, or the thickness may be measured by an electron microscope cross-sectional image, but the present disclosure is not limited thereto. Furthermore, any two values or directions used for comparison may have certain errors. The terms, such as "equal to", "equal" or "same", "substantially", or "approximately", are generally interpreted as within 10% of a given value or range. Furthermore, when a value is "in a range from a first value to a second value" or "in a range between a first value and a second value", the value can be the first value, the second value, or another value between the first value and the second value.

It should be noted that in the following embodiments, without departing from the spirit of the present disclosure, features in several different embodiments may be replaced, reorganized, and mixed to complete other embodiments. As long as the features of the various embodiments do not violate the spirit of the invention or conflict, they can be mixed and matched arbitrarily.

In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way. Herein, the "refractive index" described in the present disclosure is defined as the refractive index at an optical wavelength of 550 nm.

FIG. 1 is a cross-sectional view of a part of an electronic device according to one embodiment of the present disclosure.

As shown in FIG. 1, the electronic device of the present disclosure may comprise: a substrate 1; a color filter layer 2 disposed on the substrate 1, wherein the color filter layer 2 may comprise a light shielding unit 21 and a plurality of color filter units 22 adjacent to the light shielding unit 21, and the plurality of color filter units 22 comprises a first color filter unit 221, a second color filter unit 222 and a third color filter unit 223; and a first refractive index-matching layer 3 disposed between the substrate 1 and the color filter layer 2, wherein the first refractive index-matching layer 3 comprises an opening A1, and the opening A1 and at least one of the light shielding unit 21, the first color filter unit 221, the second color filter unit 222 and the third color filter unit 223 are overlapped in a top view Z of the substrate 1. By disposing the first reflective index-matching layer 3, the reflectivity of the surface of the electronic device can be reduced, and the contrast or optical quality of the electronic device can be improved.

More specifically, as shown in FIG. 1, the first refractive index-matching layer 3 comprises an opening A1 and a first region A2 outside the opening A1, and the first region A2 is disposed between the substrate 1 and the light shielding unit 21. In the top view Z of the substrate 1, the first region A2 of the first refractive index-matching layer 3 and the light shielding unit 21 may be overlapped, and the opening A1 is overlapped with the first color filter unit 221, the second color filter unit 222 and the third color filter unit 223. Since the reflectivity of the light shielding unit 21 and the color filter units 22 are different, when ambient light from the outside is incident on the color filter layer 2, different areas on the surface of the electronic device may have different reflectivity. By disposing the first region A2 of the first reflective index-matching layer 3 between the substrate 1 and the light shielding unit 21, the reflectivity of the surface of the electronic device can be reduced, thereby improving the contrast of the electronic device.

In addition, for the convenience of description, only one filter unit set of the color filter layer 2 are shown in FIG. 1 as an example, wherein the filter unit set includes the light shielding layer 21 and the color filter units 22. In other words, the color filter layer 2 may include a plurality of filter unit sets, and each filter unit set may include a light shielding layer 21, a first color filter unit 221, a second color filter unit 222 and a third color filter unit 223. Thus, in one embodiment of the present disclosure, the opening A1 of the first refractive index-matching layer 3 may be a closed opening in the top view Z of the substrate 1.

In the present disclosure, the material of substrate 1 may include quartz, glass, silicon wafer, sapphire, polycarbonate (PC), polyimide (PI), polypropylene (PP), polyethylene terephthalate (PET), or other plastic or polymer materials, or a combination thereof, but the present disclosure is not limited thereto. In the present disclosure, the first color filter unit 221 may be a red color filter unit, the second color filter unit 222 may be a green color filter unit, and the third color filter unit 223 may be a blue color filter unit, but the present disclosure is not limited thereto. In the present disclosure, the first refractive index-matching layer 3 may comprise a transparent material, and suitable materials may include silicon oxide, silicon nitride, silicon oxynitride, or a combination thereof, but the present disclosure is not limited thereto. The first refractive index-matching layer 3 may be a single layer or a multi-layer film set as a whole. In addition, a refractive index of the first refractive index-matching layer 3 may be between a refractive index of the substrate 1 and a refractive index of the light shielding unit 21. Furthermore, the refractive index of the first refractive index-matching layer 3 may be between the refractive index of the substrate 1 and a refractive index of one of the plurality of color filter units 22. In the present disclosure, the refractive index of the first refractive index-matching layer 3 measured at a wavelength of 550 nm is greater than or equal to 1.52 and less than or equal to 1.75. In the present disclosure, a thickness of the first refractive index-matching layer 3 may be greater than or equal to 20 nm and less than or equal to 80 nm.

In the present embodiment, a substrate 1 is firstly provided, followed by disposing a refractive index-matching layer and a light shielding unit 21 on the substrate 1. Next, the refractive index-matching layer is patterned to form a first refractive index-matching layer 3, wherein the first refractive index-matching layer 3 comprises an opening A1. Then, a first color filter unit 221, a second color filter unit 222 and a third color filter unit 223 are respectively disposed on the substrate 1 to form a part of the electronic device shown in FIG. 1, wherein the first color filter unit 221, the second color filter unit 222 and the third color filter unit 223 are overlapped with the opening A1 of the first refractive index-matching layer 3 in the top view Z of the substrate 1. In the present disclosure, any suitable method may be used to pattern the refractive index-matching layer, and suitable methods may include photolithography and etching, wherein etching may include dry etching or wet etching, but the present disclosure is not limited thereto.

Figure 2:
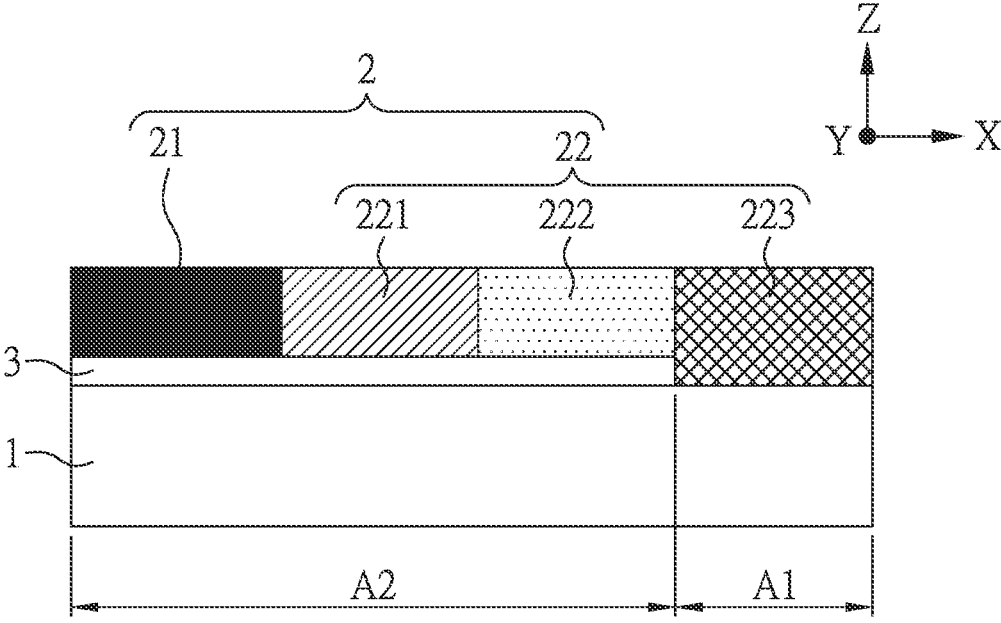
FIG. 2 is a cross-sectional view of a part of an electronic device according to one embodiment of the present disclosure.

FIG. 2 is a cross-sectional view of a part of an electronic device according to one embodiment of the present disclosure. The electronic device shown in FIG. 2 is similar to that shown in FIG. 1, except for the following differences.

As shown in FIG. 2, the first region A2 of the first reflective index-matching layer 3 may be further disposed between the substrate 1 and the first color filter unit 221 and between the substrate 1 and the second color filter unit 222. In other words, in the top view Z of the substrate 1, the first region A2 of the first reflective index-matching layer 3 may be overlapped with the light shielding unit 21, the first color filter unit 221 and the second color filter unit 222, and the opening A1 may be overlapped with the third color filter unit 223. Since the reflectivity of each color filter unit 22 is different from each other, in one embodiment of the present disclosure, when the third color filter unit 223 is a blue color filter unit, the first region A2 of the first refractive index-matching layer 3 and the third color filter unit 223 may not be overlapped in the top view Z of the substrate 1, so that the reflectivity of the surface of the electronic device can be reduced. In the present embodiment, the substrate 1, the color filter layer 2 and the first refractive index-matching layer 3 are similar to those shown in FIG. 1, and are not described again. In addition, even not shown in the figure, in one embodiment of the present disclosure, the first region A2 of the first refractive index-matching layer 3 may be disposed between the substrate 1 and the light shielding unit 21 and between the substrate 1 and the first color filter unit 221. In other words, in the top view Z of the substrate 1, the first region A2 of the first refractive index-matching layer 3 may be overlapped with one of the light shielding unit 21 and the first color filter unit 221, and the opening A1 may be overlapped with one of the second color filter unit 222 and the third color filter unit 223.

Figures 3, 4:
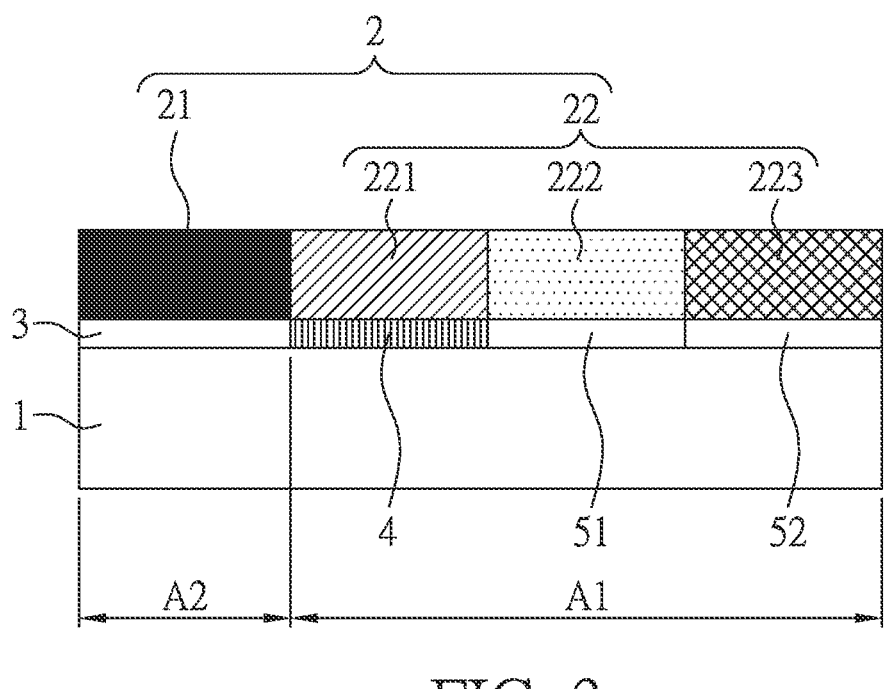
FIG. 3 is a cross-sectional view of a part of an electronic device according to one embodiment of the present disclosure.
FIG. 4 is a cross-sectional view of a part of an electronic device according to one embodiment of the present disclosure.

FIG. 3 is a cross-sectional view of a part of an electronic device according to one embodiment of the present disclosure. The electronic device shown in FIG. 3 is similar to that shown in FIG. 1, except for the following differences.

As shown in FIG. 3, the electronic device may further comprise a second refractive index-matching layer 4 disposed between the substrate 1 and the first color filter unit 221, wherein the opening A1 of the first refractive index-matching layer 3 and the second refractive index-matching layer 4 may be overlapped in the top view Z of the substrate 1. More specifically, the second refractive index-matching layer 4 may be disposed in the opening A1 of the first refractive index-matching layer 3, and the second refractive index-matching layer 4 may be overlapped with one of the first color filter unit 221, the second color filter unit 222 and the color filter unit 223 in the top view Z of the substrate 1. Since the reflectivity of the light shielding unit 21, the first color filter unit 221, the second color filter unit 222 and the third color filter unit 223 may be different from each other, the reflectivity of the surface of the electronic device can be further reduced by disposing different reflective index-matching layers in different regions of the substrate 1.

In the present embodiment, the substrate 1, the color filter layer 2 and the first refractive index-matching layer 3 are similar to those shown in FIG. 1, and are not described again. In addition, the second refractive index-matching layer 4 may be prepared using a material similar to the first refractive index-matching layer 3, and the refractive index of the first refractive index-matching layer 3 is different from the refractive index of the second refractive index-matching layer 4. The refractive index of the second refractive index-matching layer 4 may be between the refractive index of the substrate 1 and the refractive index of the light shielding unit 21, and/or the refractive index of the second refractive index-matching layer 4 may be between the refractive index of the substrate 1 and the refractive index of the first color filter unit 221. In the present disclosure, the refractive index of the second refractive index-matching layer 4 measured at the wavelength of 550 nm is greater than or equal to 1.52 and less than or equal to 1.75. In the present disclosure, the refractive index of the first refractive index-matching layer 3 may be greater than the refractive index of the second refractive index-matching layer 4. In the present disclosure, the thickness of the second refractive index-matching layer 4 may be greater than or equal to 20 nm and less than or equal to 80 nm.

In addition, as shown in FIG. 3, the electronic device may further comprises a plurality of refractive index-matching layers 51, 52 respectively disposed between the substrate 1 and the second color filter unit 222 and between the substrate 1 and the third color filter unit 223. In the top view Z of the substrate 1, the plurality of refractive index-matching layers 51, 52 are respectively overlapped with the second color filter unit 222 and the third color filter unit 223. More specifically, the plurality of refractive index-matching layers 51, 52 may be respectively disposed in the opening A1 of the first refractive index-matching layer 3, and the plurality of refractive index-matching layers 51, 52 may be overlapped with the opening A1 and the second color filter unit 222 or the third color filter unit 223 in the top view Z of the substrate 1. Herein, the materials of the plurality of refractive index-matching layers 51, 52 may be similar to that of the first refractive index-matching layer 3, and are not be described again. In addition, the plurality of refractive index-matching layers 51, 52 may be prepared using the same or different materials as the first refractive index-matching layer 3 and/or the second refractive index-matching layer 4. Furthermore, the plurality of refractive index-matching layers 51, 52 may be made of different materials to match the different reflectivity of different areas in the color filter layer, so as to reduce the reflectivity of the surface of the electronic device and improve the contrast of the electronic device.

In the present embodiment, after disposing the refractive index-matching layer and the light shielding unit 21 on the substrate 1, the refractive index-matching layer is patterned to form the first refractive index-matching layer 3. Next, after disposing another refractive index-matching layer on substrate 1, the first color filter unit 221 is disposed on the other refractive index-matching layer, and then the other refractive index-matching layer is patterned to form a second refractive index-matching layer 4. Then, the above steps are repeated to form a plurality of refractive index-matching layers 51, 52, the second color filter unit 222 and the third color filter unit 223, wherein the plurality of refractive index-matching layers 51, 52 are respectively disposed between the substrate 1 and the second color filter unit 222 and between the substrate 1 and the third color filter unit 223. The method of patterning the refractive index-matching layer is as described above, and are not be described again.

FIG. 4 is a cross-sectional view of a part of an electronic device according to one embodiment of the present disclosure. The electronic device shown in FIG. 4 is similar to that shown in FIG. 1, except for the following differences.

As shown in FIG. 4, the first region A2 of the first refractive index-matching layer 3 is disposed between substrate 1 and a plurality of color filter units 22. In the top view Z of the substrate 1, the first region A2 of the first refractive index-matching layer 3 may be overlapped with the first color filter unit 221, the second color filter unit 222 and the third color filter unit 223, and the opening A1 may be overlapped with the light shielding unit 21. The electronic device may further comprise a third refractive index-matching layer 6 disposed between the substrate 1 and the color filter layer 2 (herein, the light shielding unit 21), wherein the third refractive index-matching layer 6 may be overlapped with the light shielding unit 21 and the opening A1 in the top view Z of the substrate 1. In addition, the electronic device may further comprise a fourth refractive index-matching layer 7 disposed on the light shielding unit 21. More specifically, the fourth refractive index-matching layer 7 and the light shielding unit 21 are overlapped in the top view Z of the substrate 1.

In the present disclosure, the substrate 1, the color filter layer 2 and the first refractive index-matching layer 3 are similar to those shown in FIG. 1, and are not described again. In addition, the third refractive index-matching layer 6 and the fourth refractive index-matching layer 7 may be prepared using a material similar to the first refractive index-matching layer 3, and the refractive index of the first refractive index-matching layer 3 is different from the refractive index of the third refractive index-matching layer 6 and/or the refractive index of the fourth refractive index-matching layer 7. In the present embodiment, the refractive index of the first refractive index-matching layer 3 is different from the refractive index of the third refractive index-matching layer 6, and the refractive index of the first refractive index-matching layer 3 is the same as the refractive index of the fourth refractive index-matching layer 7. In addition, the refractive index of the third refractive index-matching layer 6 and the refractive index of the fourth refractive index-matching layer 7 may be between the refractive index of the substrate 1 and the refractive index of the light shielding unit 21. In the present disclosure, the refractive index of the third refractive index-matching layer 6 and the refractive index of the fourth refractive index-matching layer 7 measured at a wavelength of 550 nm may respectively be greater than or equal to 1.52 and less than or equal to 1.75. In the present disclosure, the thickness of the third refractive index-matching layer 6 and the thickness of the fourth refractive index-matching layer 7 may respectively be greater than or equal to 20 nm and less than or equal to 80 nm.

In the present embodiment, after disposing the refractive index-matching layer and the light shielding unit 21 on the substrate 1, the refractive index-matching layer is patterned to form the third refractive index-matching layer 6. Next, another refractive index-matching layer is disposed on the substrate 1 and light shielding unit 21 to form the first refractive index-matching layer 3 and the fourth refractive index-matching layer 7. Then, the first color filter unit 221, the second color filter unit 222 and the third color filter unit 223 are respectively formed on the first refractive index-matching layer 3, thereby forming the electronic device shown in FIG. 4. Herein, the method of patterning the refractive index-matching layer is as described above, and are not described again.

Figure 5:
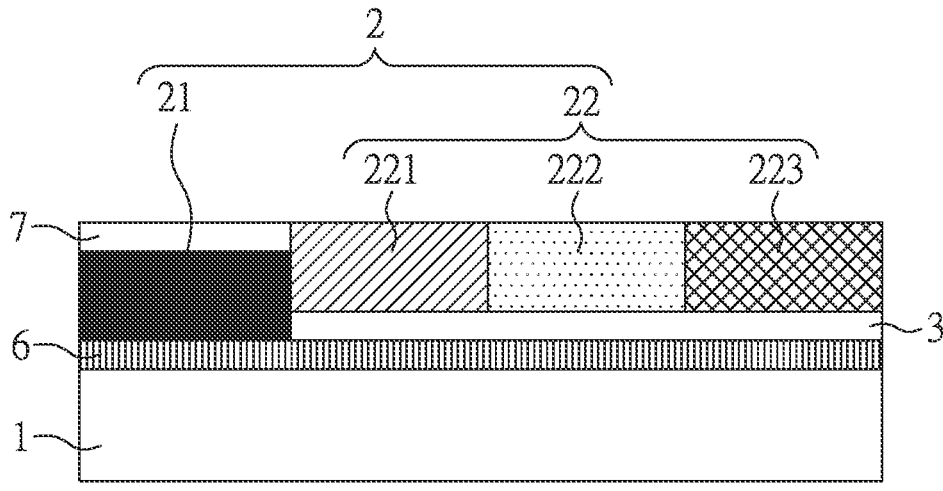
FIG. 5 is a cross-sectional view of a part of an electronic device according to one embodiment of the present disclosure.

FIG. 5 is a cross-sectional view of a part of an electronic device according to one embodiment of the present disclosure. The electronic device shown in FIG. 5 is similar to that shown in FIG. 4, except for the following differences.

As shown in FIG. 5, the third refractive index-matching layer 6 may further be disposed between the substrate 1 and the plurality of color filter units 22, wherein at least a part of the third refractive index-matching layer 6 and the first refractive index-matching layer 3 are overlapped in the top view Z of the substrate 1. More specifically, in the top view Z of the substrate 1, the first refractive index-matching layer 3 and the plurality of color filter units 22 may be overlapped, and the third refractive index-matching layer 6 and the light shielding unit 21 as well as the plurality of color filter units 22 may be overlapped.

In the present disclosure, the substrate 1, the color filter layer 2, the first refractive index-matching layer 3, the third refractive index-matching layer 6 and the fourth refractive index-matching layer 7 are similar to those shown in FIG. 4, and are not described again. In the present embodiment, the refractive index of the first refractive index-matching layer 3 is diffrent from the refractive index of the third refractive index-matching layer 6, and the refractive index of the first refractive index-matching layer 3 is the same as the refractive index of the fourth refractive index-matching layer 7. In addition, the refractive index of the third refractive index-matching layer 6 and the refractive index of the fourth refractive index-matching layer 7 may be between the refractive index of the substrate 1 and the refractive index of the light shielding unit 21. In the present disclosure, the refractive index of the third refractive index-matching layer 6 and the refractive index of the fourth refractive index-matching layer 7 measured at a wavelength of 550 nm may respectively be greater than or equal to 1.52 and less than or equal to 1.75. In addition, the thickness of the third refractive index-matching layer 6 and the thickness of the fourth refractive index-matching layer 7 may respectively be greater than or equal to 20 nm and less than or equal to 80 nm.

In the present embodiment, after disposing the third refractive index-matching layer 6 on the substrate 1, the light shielding unit 21 is disposed on the third refractive index-matching layer 6. Next, another refractive index-matching layer is disposed on substrate 1 to form the first refractive index-matching layer 3 and the fourth refractive index-matching layer 7. Then, the first color filter unit 221, the second color filter unit 222 and the third color filter unit 223 are respectively formed on the first refractive index-matching layer 3, thereby forming the electronic device shown in FIG. 5. In the present embodiment, since no additional step of patterning the refractive index matching-layer is required, the effect of simplifying the manufacturing process can be achieved.

Figure 6:
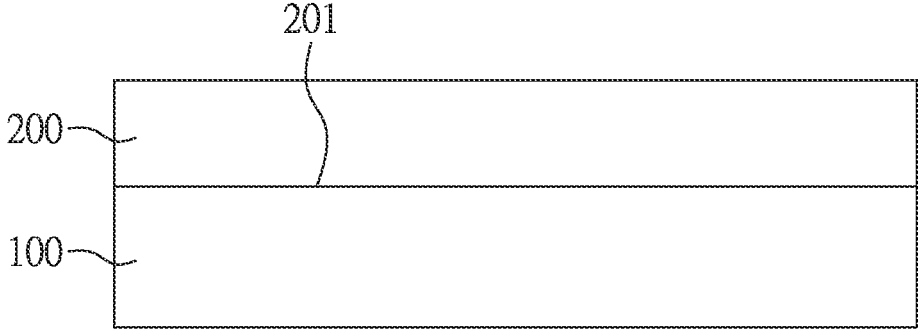
FIG. 6 is a schematic view of an electronic device according to one embodiment of the present disclosure.

FIG. 6 is a schematic view of an electronic device according to one embodiment of the present disclosure.

As shown in FIG. 6, the electronic device of the present disclosure may comprise a first substrate 100 and a second substrate 200 opposite to the first substrate 100, wherein the second substrate 200 may be any one shown in FIG. 1 to FIG. 5. More specifically, the surface 201 of the second substrate 200 facing the first substrate 100 may be disposed with the color filter layer 2 and the refractive index-matching layer shown in any one of FIG. 1 to FIG. 5. In the present disclosure, the first substrate 100 may be a transistor substrate (TFT substrate) and the second substrate 200 may be a color filter substrate or a cover substrate; but the present disclosure is not limited thereto.

In addition, even not shown in the figure, in one embodiment of the present disclosure, a medium layer may be further included between the first substrate 100 and the second substrate 200. The material of the medium layer may include liquid crystals, organic light-emitting diodes (OLEDs), quantum dots (QDs), fluorescent molecules, phosphors, light-emitting diodes (LEDs), micro light-emitting diodes (micro-LEDs), mini light-emitting diodes (mini-LEDs) or various electronic components, but the present disclosure is not limited thereto. The electronic device of the present disclosure can be applied to any electronic device that needs a display screen, such as monitors, mobile phones, notebook computers, cameras, still cameras, music players, mobile navigators, TV sets, car displays and other electronic devices that display images. In addition, when the electronic device is a tiled display system, the electronic device can be applied to any electronic device that needs to display large images, such as a video wall or a billboard. In addition, it is further explained that if the material of the medium layer is liquid crystals, the electronic device of the present disclosure may further include a backlight, which is disposed on the side of the first substrate away from the second substrate.

The above specific examples should be construed as merely illustrative and not restrictive of the remainder of the disclosure in any way.

Although the present disclosure has been explained in relation to its embodiment, it is to be understood that many other possible modifications and variations can be made without departing from the spirit and scope of the disclosure as hereinafter claimed.

The invention claimed is:

1. An electronic device, comprising:
   a substrate;
   a color filter layer disposed on the substrate, wherein the color filter layer comprises a light shielding unit and a plurality of color filter units adjacent to the light shielding unit, and the plurality of color filter units comprises a first color filter unit, a second color filter unit and a third color filter unit;
   a first refractive index-matching layer disposed between the substrate and the color filter layer, wherein the first refractive index-matching layer comprises an opening, and the opening and at least one of the light shielding unit, the first color filter unit, the second color filter unit and the third color filter unit are overlapped in a top view of the substrate; and
   a third refractive index-matching layer disposed between the substrate and the color filter layer, wherein the third refractive index-matching layer and the light shielding unit are overlapped in the top view of the substrate, and a refractive index of the first refractive index-matching layer is different from a refractive index of the third refractive index-matching layer,
   wherein the third refractive index-matching layer and at least one of plurality of color filter units are overlapped in the top view of the substrate.

2. The electronic device of claim 1, wherein the refractive index of the first refractive index-matching layer is between a refractive index of the substrate and a refractive index of the light shielding unit.

3. The electronic device of claim 1, wherein the refractive index of the first refractive index-matching layer is between a refractive index of the substrate and a refractive index of one of the plurality of color filter units.

4. The electronic device of claim 1, wherein the refractive index of the first refractive index-matching layer measured at a wavelength of 550 nm is greater than or equal to 1.52 and less than or equal to 1.75.

5. The electronic device of claim 1, wherein the refractive index of the third refractive index-matching layer measured at a wavelength of 550 nm is greater than or equal to 1.52 and less than or equal to 1.75.

6. The electronic device of claim 1, wherein the refractive index of the third refractive index-matching layer is between a refractive index of the substrate and a refractive index of the light shielding unit.

7. The electronic device of claim 1, wherein the third refractive index-matching layer and the opening are overlapped in the top view of the substrate.

8. The electronic device of claim 7, wherein at least a part of the third refractive index-matching layer and the first refractive index-matching layer are overlapped in the top view of the substrate.

9. The electronic device of claim 1, further comprising a fourth refractive index-matching layer disposed on the light shielding unit, wherein the refractive index of the first refractive index-matching layer is the same as a refractive index of the fourth refractive index-matching layer.

10. The electronic device of claim 9, wherein the refractive index of the fourth refractive index-matching layer measured at a wavelength of 550 nm is greater than or equal to 1.52 and less than or equal to 1.75.

11. The electronic device of claim 9, wherein the refractive index of the fourth refractive index-matching layer is between a refractive index of the substrate and a refractive index of the light shielding unit.

12. The electronic device of claim 1, wherein a thickness of the first refractive index-matching layer is greater than or equal to 20 nm and less than or equal to 80 nm.

* * * * *